(12) United States Patent
Kodimer (10) Patent No.: US 10,868,927 B1
(45) Date of Patent: Dec. 15, 2020

(54) SYSTEM AND METHOD FOR MACHINE LEARNING ASSISTED MULTIFUNCTION PERIPHERAL FLEET MANAGEMENT VIA A HANDHELD DEVICE

(71) Applicant: Toshiba TEC Kabushiki Kaisha, Shinagawa-ku (JP)

(72) Inventor: Marianne Kodimer, Huntington Beach, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/791,412

(22) Filed: Feb. 14, 2020

(51) Int. Cl.
*H04N 1/00* (2006.01)

(52) U.S. Cl.
CPC ..... *H04N 1/00395* (2013.01); *H04N 1/00411* (2013.01); *H04N 1/00511* (2013.01)

(58) Field of Classification Search
None
See application file for complete search history.

(56) References Cited

U.S. PATENT DOCUMENTS

| 2002/0143617 | A1* | 10/2002 | Borg | G06Q 30/0251 705/14.49 |
| 2004/0078425 | A1* | 4/2004 | Sandfort | H04L 67/22 709/203 |

* cited by examiner

*Primary Examiner* — Lennin R Rodriguezgonzalez
(74) *Attorney, Agent, or Firm* — Ulmer & Berne LLP (57) ABSTRACT

A system and method for maintaining and optimizing a fleet of multifunction peripherals is operated by use of a smartphone or tablet computer. Fleet changes are provided in multiple categories such as software updates, configuration changes and feature activation. A user is provided with a dashboard having a selectable indicia for each category. Devices are monitored and machine learning provides for recommendations for each category. A badge showing a number of recommendations for each category is displayed with its selectable indicia. When an indicia is selected, an associated recommendation is displayed and implemented if accepted. Once accepted, the dashboard is regenerated with updated badge information reflecting an accepted implementation.

20 Claims, 6 Drawing Sheets

SYSTEM AND METHOD FOR MACHINE LEARNING ASSISTED MULTIFUNCTION PERIPHERAL FLEET MANAGEMENT VIA A HANDHELD DEVICE

TECHNICAL FIELD

This application relates generally to management of groups of multifunction peripherals. The application relates more particularly to application of machine learning to data from monitored multifunction peripherals to provide recommendations selectable by an administrator via a handheld device.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Many businesses have a large number of MFPs in service. It may be extremely difficult to determine what could be done to improve device operations or user convenience for a large number of devices.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Recommendation engines are often used to recommend products and services to users based on the characteristics of other similar users and/or products. Currently, art exists to make predictions for an MFP based on similar MFPs. Using this data is difficult for most users in a business environment for problem solving.

Example embodiments described herein provide a mobile app that enables a non-technical end user to accomplish MFP fleet management via a straightforward user interface that makes use of artificial intelligence applied to device data to improve company efficiency, reduce costs or fix errors based on a recommendation engine. Selections are suitably made with a one-touch action button to update devices, set appointments, or get fix assistance based on recommendations. As described in further detail below, the user interface includes icons or badges to indicate counts, and organize issued recommendations which are visually updated dynamically as issues are addressed, are no longer an issue or an when an MFP fleet is updated.

Figure 1:
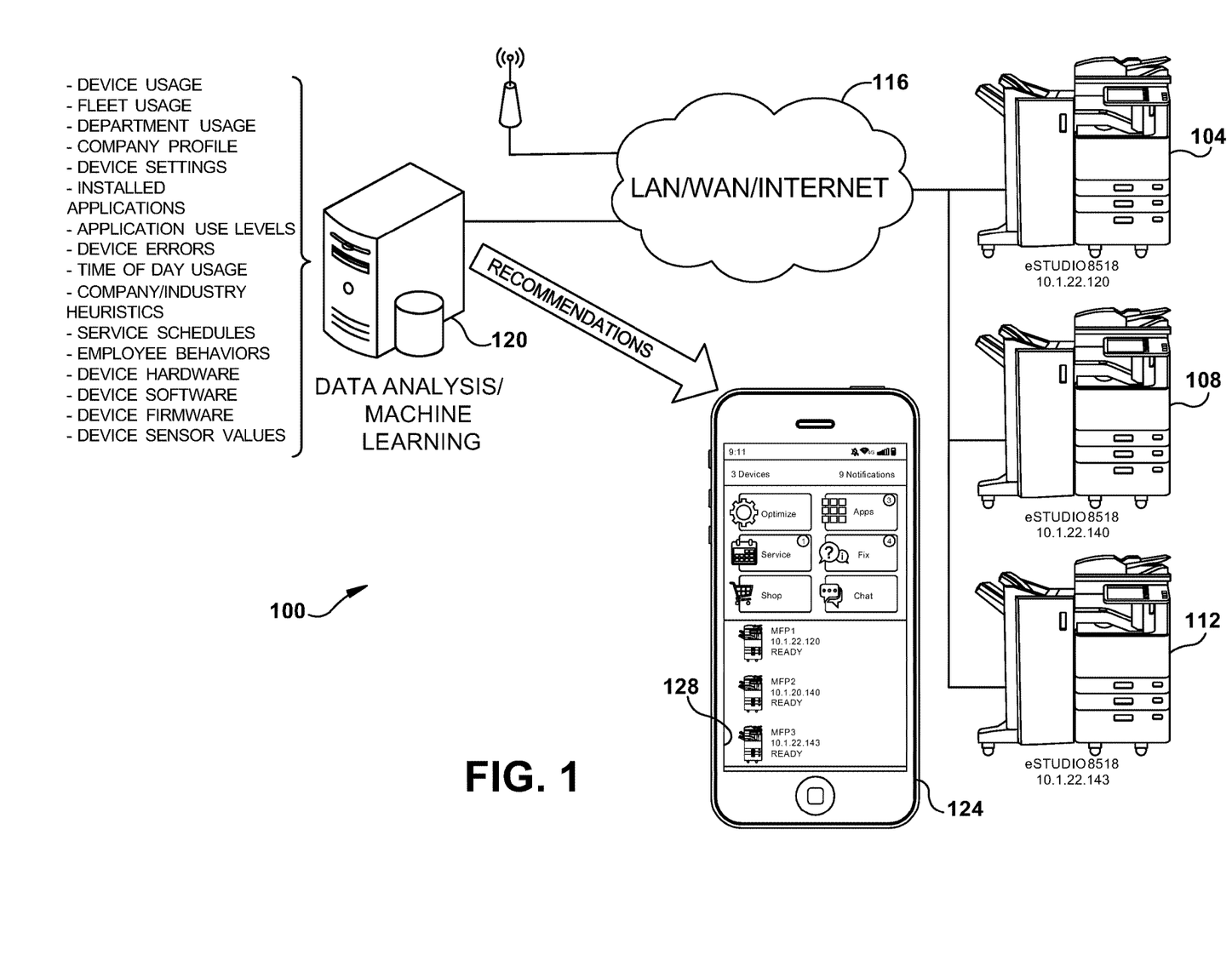
FIG. 1 is an example embodiment of a multifunction peripheral fleet maintenance system.

In accordance with the subject application, FIG. 1 illustrates an example embodiment of a MFP fleet maintenance system 100 including MFPs 104, 108 and 112. A fleet is suitably comprised of any number of MFPs, which may be of the same or different types. In the illustrated example, MFPs 104 and 108 share the same capabilities and MFP 112 has different capabilities. Each MFP is suitably identified by a unique identifier, such as via their IP address. Listing of fleet MFPs can be done automatically, such as by network device discovery, or by manual addition or deletion of devices. Devices in FIG. 1 are in data communication across a network 116 through any suitable wired or wireless means, via a local area network (LAN), wide area network (WAN), which may comprise the INTERNET, or any suitable combination thereof. Included is a data analysis server 120, suitable for application of artificial intelligence, including machine learning, to accumulated data. In the illustrated example, data is acquired from a myriad of sources associated with MFP status as monitored or reported. Status includes usage data and device status data, as well as data corresponding to user behaviors, company specific use factors or industry specific use factors, as well as device configuration and device servicing. Industry specific use factors can be based on the business type, such as legal, medical, government, educational, manufacturing, or other types businesses as would be understood in the art. Heuristic data corresponding to multifunction peripheral device usage can be stored and analyzed by server 120. Server 120 suitably operates on resultant deep data by any suitable machine learning system. Suitable machine learning systems are built on available third party platforms such as R-Script, Microsoft Azure, Google Next, Kaggle.com or the like. Recommendations for software updates, device configurations or addition of software are communicated to a user data device such as a smartphone or tablet. Recommendations can be based on the stored heuristic data, device usage, business type, and other suitable information. In the illustrated example, recommendations are communicated to smartphone 124 that includes a touchscreen display 128, illustrated with a device dashboard as will be detailed further below. The user performs operations via their portable data device via a user interface to create a fleet. Recommendations automatically update based on changed conditions or user modifications. The user can also shop for products, such as new applications, for download in accordance with suggestions supplied for a defined fleet.

Predictions or recommendations are generated from application of artificial intelligence or machine learning. Example predictions include:

Individual device usage of features, apps, patterns, times of day;

Employee behaviors, habits, and analytics;

Individual device health, errors, maintenance schedule and statistics;

Aggregate device health, errors, maintenance schedule and statistics;

Company/Industry heuristics including but not limited to school, law, tech, medical, defense, contractor, government, and the like;

Aggregate data from similar devices in similar company/industry types; and

Device breakdown across departments and other company segments.

Example suggestions include:

Applications to download;

Fleet settings to change;

Individual device settings to change;

Service to schedule; and

End user fixable errors in the fleet (for example paper jam, or out of toner).

Figure 2:
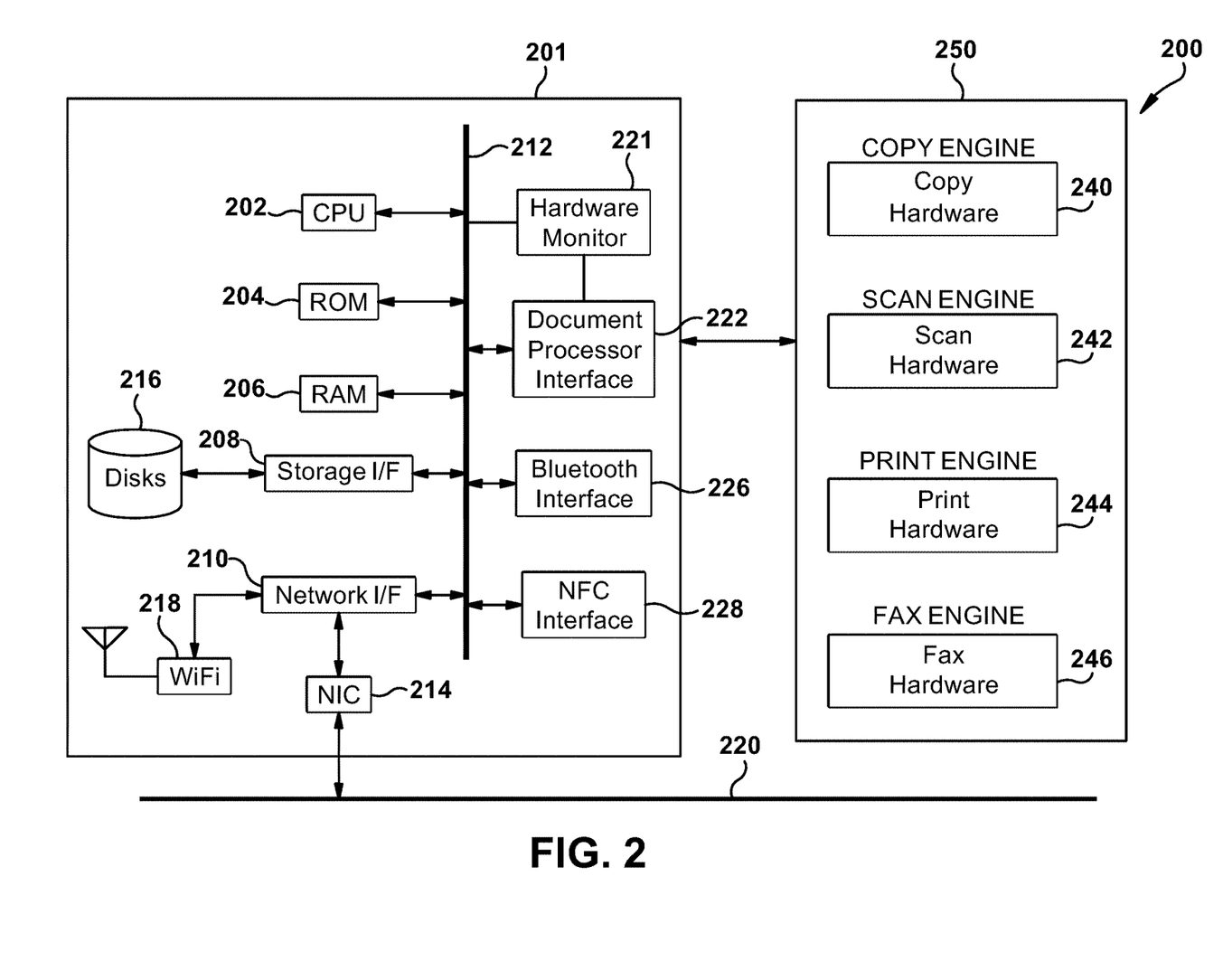
FIG. 2 is an example embodiment of a networked digital device comprising a document rendering system.

Turning now to FIG. 2 illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with Bluetooth interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
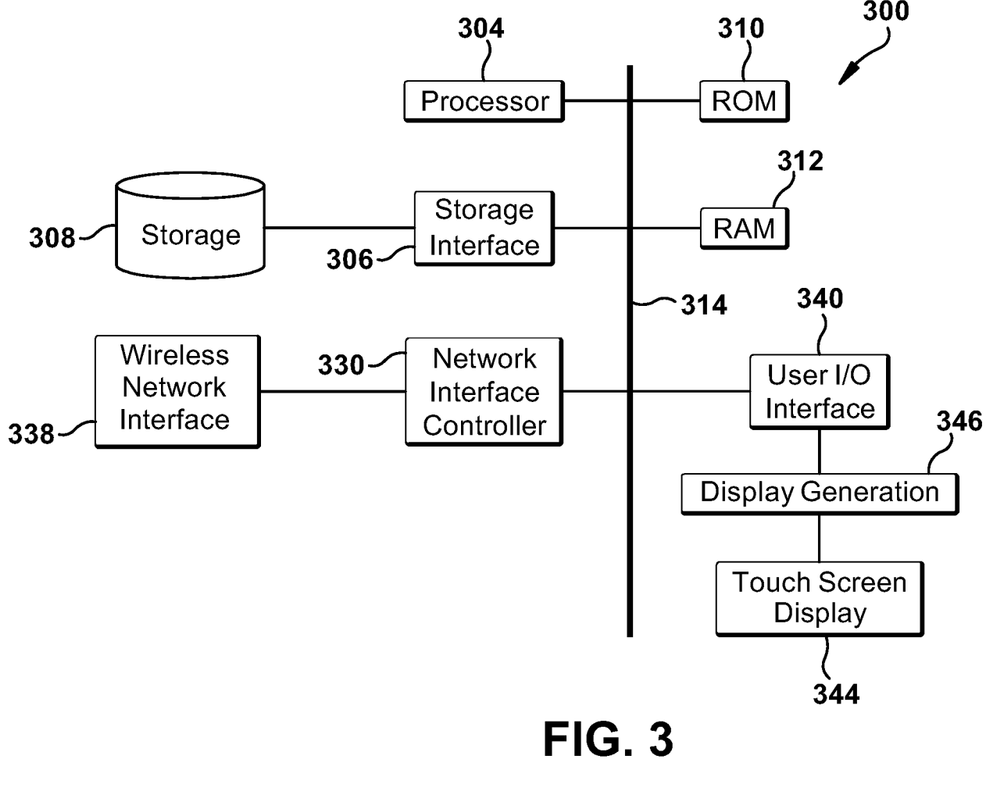
FIG. 3 is an example embodiment of a digital device system such as a smartphone or tablet computer.

Turning now to FIG. 3, illustrated is an example of a digital device system 300 suitably comprising server 120 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
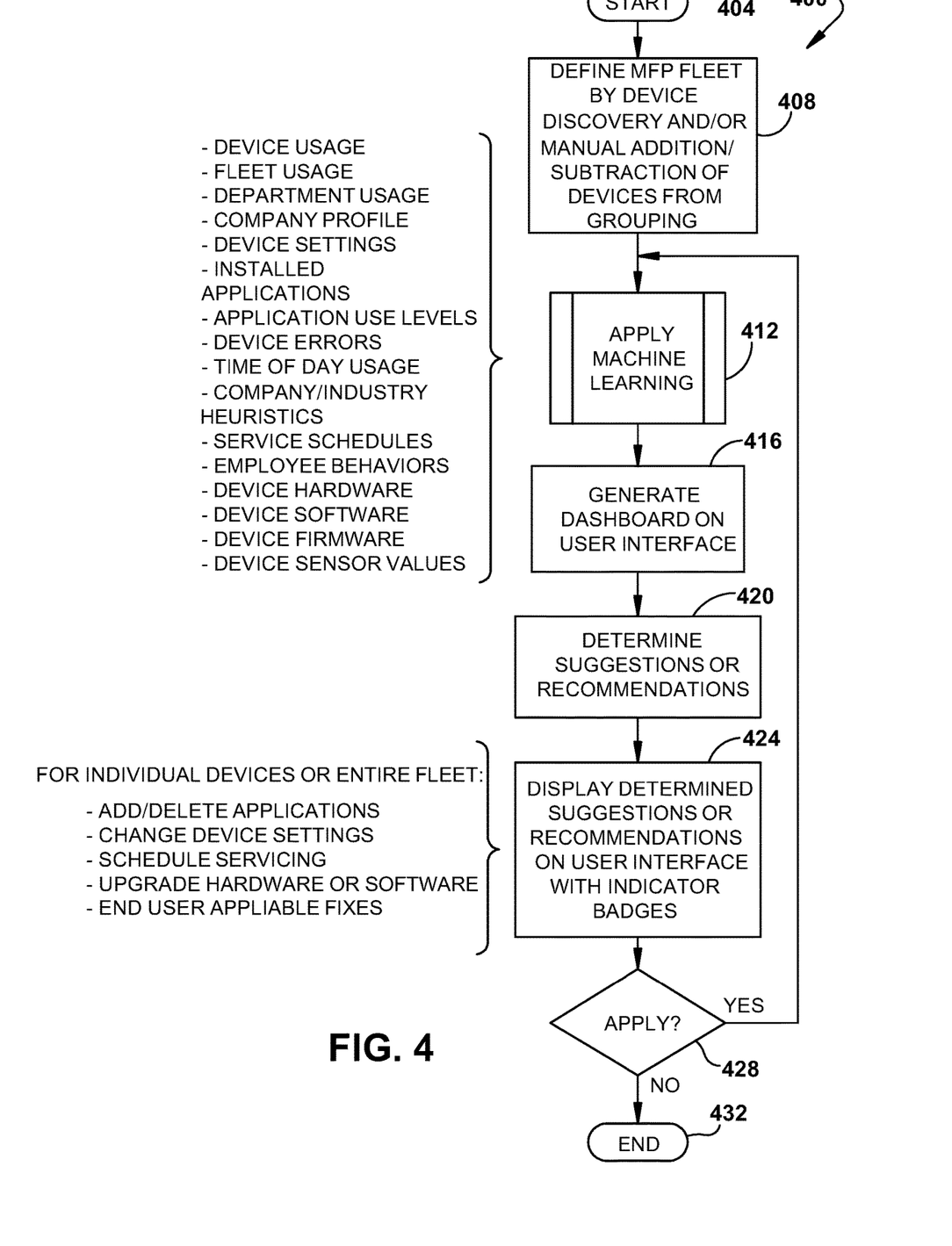
FIG. 4 is a flowchart of an example embodiment of a system for machine learning assisted multifunction peripheral fleet management via a handheld device.

FIG. 4 is a flowchart 400 of an example embodiment of a system for machine learning assisted multifunction peripheral fleet management via a handheld device. The process commences at block 404 and proceeds to block 408 where an MFP fleet is defined, automatically, manually or by a combination thereof. Machine learning is applied to device settings, configurations, human characteristics, industry characteristics, etc. at block 412 wherein suggestions for hardware, software or configuration configurations are determined. A dashboard reflective of the fleet state is generated on a user device display at block 416. Suggestions or recommendations are determined at block 420 and displayed at block 424. If the user accepts one or more of the suggestions or recommendations at block 428, they are applied to the multifunction peripherals in the fleet via a data interface of the handheld device and the system returns to block 412 where artificial intelligence is again applied to the fleet as revised. Thus, the user is provided with dynamic intelligence as modifications are made. If the user does not accept one or more of the suggestions or recommendations at block 428, then processing terminates at end block 432.

In accordance with the forgoing example, a user can define what modifications, either individually or in aggregate, should be applied to optimize the fleet. The user can also decide which applications, either individually or in aggregate, should be installed. The display dashboard indicates a number of MFPs, along with and the specific devices that have fixable errors, such as a paper jam, low toner, low paper or low ink. Certain devices may require a service ticket to fix, and appropriate services are suitably scheduled.

Figure 5:
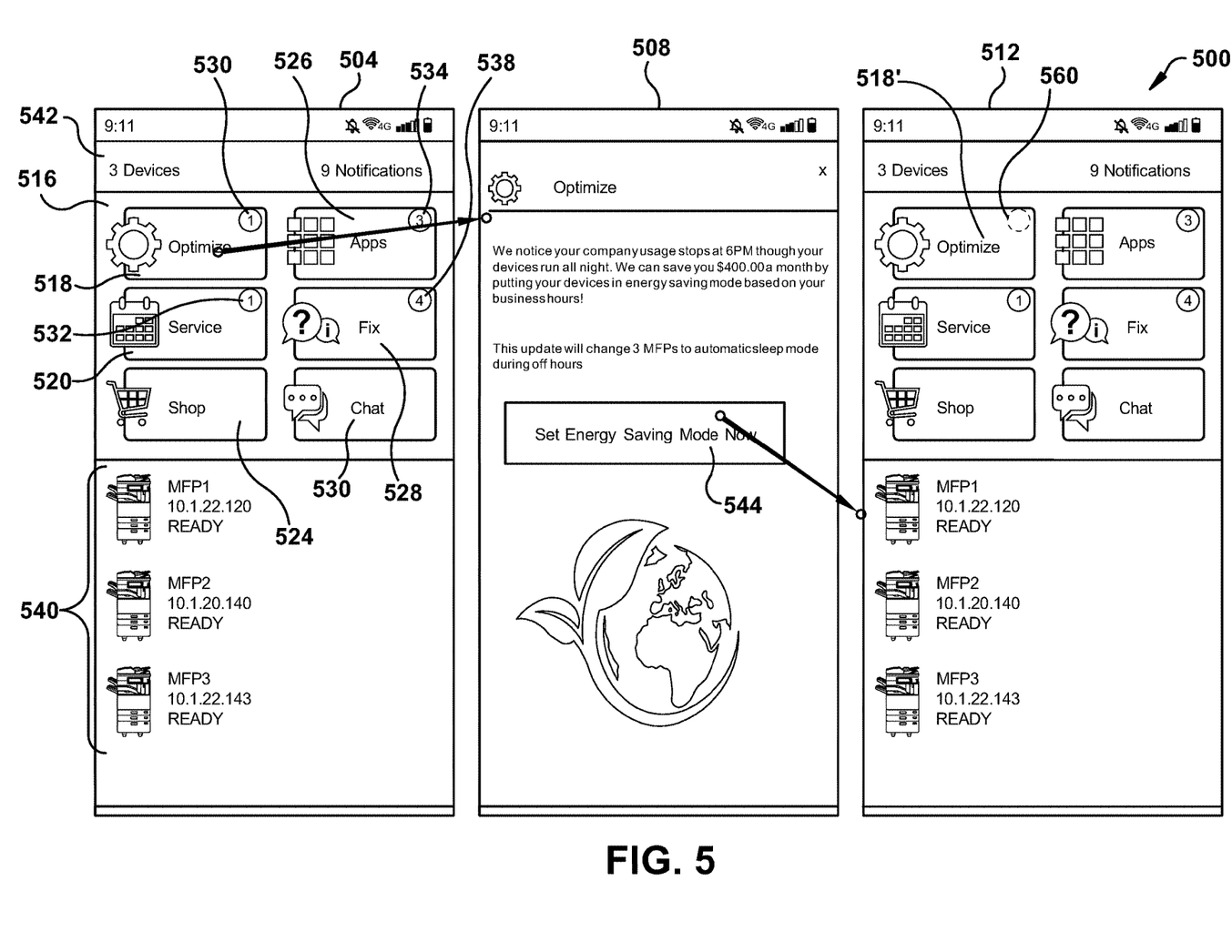
FIG. 5 is a first example embodiment of a sequence of user interface screens.

In example embodiments herein, invoking a button leads to a secondary screen where a recommendation or description is provided along with an action button. The action button provides a single click to invoke the recommended action without further assistance. Once invoked, the screen is removed and the user sees the progress or status of the device(s) being updated. FIG. 5 illustrates an example embodiment of a sequence 500 of user interface screens 504, 508 and 512, suitably generated on a touchscreen of smartphone 124 of FIG. 1. Screen 504 includes a dashboard 516 that includes user selectable display areas to optimize 518, service 520, shop 524, applications issues 526, apply fixes 528 or chat 530, such as with a technician. In the illustrated example, areas 518, 520, 526 and 528 included badges 530, 532, 534 and 538, respectively. Badges provide dynamic indication as to how many issues currently apply to the corresponding selectable area. In the example, badge 530 indicates one optimization issue, badge 532 indicates one service issue, badge 534 indicates three application issues and badge 538 indicates four fix issues. Display area 540 illustrates identified devices that are part of an associated fleet, and are suitably reflective of MFPs 104, 108 and 112 of FIG. 1. A total number of fleet devices and a total number of addressable issues are summarized in display area 542. Badges remain until action is taken by user, such as when a device is updated, when a user dismisses notifications or when a fleet is updated.

In the example, a user selects display area 516 to bring up the optimization issue reflected by badge 530. Such selection brings up screen 508 which suggest to the user that implementation of an energy saving mode can save money. The user can accept the suggestion by touching button 544 which, in this example, applies an energy saving mode to all fleet devices. Once selected, screen 512 is generated. It will be noted that there is no longer a badge located at position 560 for the user selectable display area associated with optimize button 518', since the one associated issue was addressed.

Figure 6:
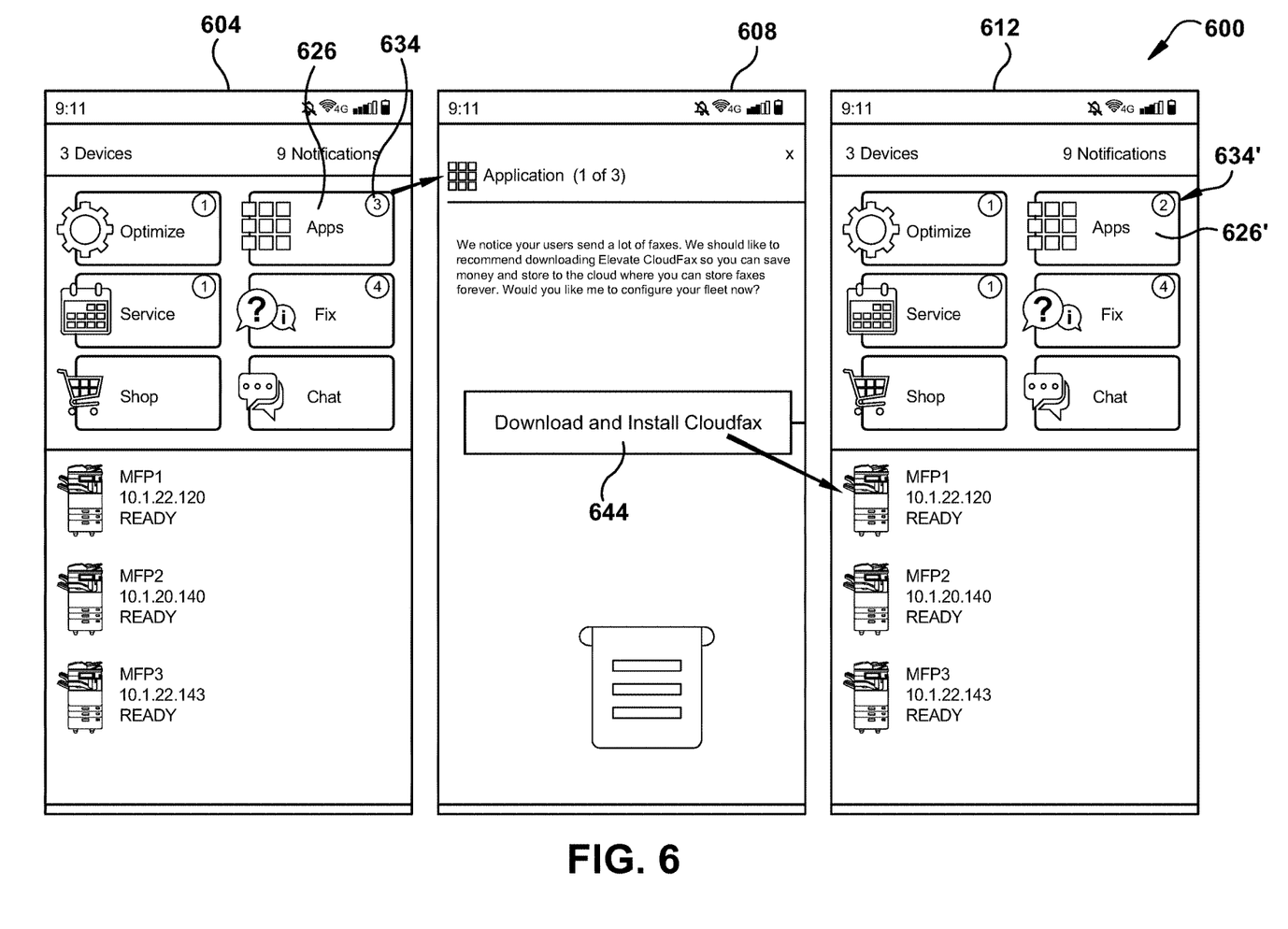
FIG. 6 is a second example embodiment of a sequence of user interface screens.

FIG. 6 illustrates an example embodiment of a sequence 600 of user interface screens 604, 608 and 612. In this example, on screen 604 the user selects apps button 626 which lists three application issues in badge 634. This generates screen 608 relating to one of the three issues. In this issue, the user is presented with a suggestion to install a facsimile solution on the MFP fleet. If the user agrees, they select button 644, and the application is suitably downloaded and installed on the fleet. Next, screen 612 is generated, and it will be noted that badge 634' appears on apps button 626', noting one fewer application issue. Accordingly, a dynamic user interface will be noted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a user interface including a user input and a display;
a data interface;
a memory,
the memory configured to store status data corresponding to a status of each of a plurality of multifunction peripherals,
the memory further configured to store usage data corresponding to usage levels of each of the plurality of multifunction peripherals, and
the memory further configured to store solution data corresponding to each of a plurality of solution sets, each solution set associated with remediation of associated multifunction peripheral issues in a unique, predefined category; and
a processor,
the processor further configured to identify one or more multifunction peripheral device issues in accordance with the status data and the usage data,
the processor further configured to generate recommendation data corresponding to recommended actions relative to one or more of the multifunction peripherals in accordance solution data corresponding to identified issues,
the processor further configured to generate, on the display, a dashboard including indicia associated with each predefined category displayed associatively with a badge indicating a corresponding number of recommended actions for that category,
the processor further configured to generate user recommendations on the display in accordance with generated recommendation data,
the processor further configures to receive, via the user input, user instructions responsive to displayed user recommendations,
the processor further configured to selectively implement one or more of the recommended actions via the data interface in accordance with received user instructions, and
the processor further configured to generate an updated dashboard on the display including an updated badge reflective of implemented recommended actions.

2. The system of claim 1 wherein the status data corresponds to device maintenance issues associated with one or more of the multifunction peripherals.

3. The system of claim 2 wherein the status data further corresponds to device health issues and device maintenance issues.

4. The system of claim 1 wherein the usage data corresponds to multifunction peripheral application usage.

5. The system of claim 4 wherein the usage data further corresponds to application usage levels and time of day usage levels.

6. The system of claim 1 wherein the user recommendations comprise one or more applications suggested for installation on the multifunction peripherals.

7. The system of claim 1 wherein the user recommendations comprise recommended modifications to multifunction peripheral device settings.

8. The system of claim 1 wherein the memory is further configured to store heuristic data corresponding to multifunction peripheral device usage propensities associated with a business type with which the multifunction peripherals are deployed, and wherein the processor is further configured to generate the recommendation data in accordance with the heuristic data.

9. A method comprising:
storing status data corresponding to a status of each of a plurality of multifunction peripherals;
storing, in a memory, usage data corresponding to usage levels of each of the plurality of multifunction peripherals in the memory;
storing, in the memory, solution data corresponding to each of a plurality of solutions sets, each solution set associated with remediation of associated multifunction peripheral issues in the memory in a unique, predefined category;

identifying, via a processor, one or more multifunction peripheral device issues in accordance with the status data and the usage data;

generating recommendation data corresponding to recommended actions relative to one or more of the multifunction peripherals in accordance solution data corresponding to identified issues;

generating, on the display, a dashboard including indicia associated with each predefined category displayed associatively with a badge indicating a corresponding number of recommended actions for that category;

generating user recommendations on the display in accordance with generated recommendation data;

receiving, via the user input, user instructions responsive to displayed user recommendations;

selectively implementing, via a data interface, one or more of the recommended actions in accordance with received user instructions; and generating an updated dashboard on the display including an updated badge reflective of implemented recommended actions.

10. The method of claim 9 wherein the status data corresponds to device maintenance issues associated with one or more of the multifunction peripherals.

11. The method of claim 10 wherein the status data further corresponds to device health issues and device maintenance issues.

12. The method of claim 9 wherein the usage data corresponds to multifunction peripheral application usage.

13. The method of claim 12 wherein the usage data further corresponds to application usage levels and time of day usage levels.

14. The method of claim 9 wherein the user recommendations comprise one or more applications suggested for installation on the multifunction peripherals.

15. The method of claim 9 wherein the user recommendations comprise recommended modifications to multifunction peripheral device settings.

16. The method of claim 9 further comprising storing heuristic data corresponding to multifunction peripheral device usage propensities associated with a business type with which the multifunction peripherals are deployed, and generating the recommendation data in accordance with the heuristic data.

17. A system comprising:
a user interface including a user input and a display;
a data interface;
a memory,
the memory configured to store status data corresponding to a status of each of a plurality of multifunction peripherals, wherein the status data comprises data corresponding to device errors and device maintenance;

the memory further configured to store usage data corresponding to usage levels of each of the plurality of multifunction peripherals, wherein the usage data comprises data corresponding to applications used and device features used;

the memory further configured to store solution data corresponding to each of a plurality of solution sets, each solution set associated with remediation of associated multifunction peripheral issues in a unique, predefined category, wherein the solution data sets include two or more of device setting changes, modification of installed applications and device servicing;

a processor,
the processor further configured to identify one or more multifunction peripheral device issues in accordance with the status data and the usage data;

the processor further configured to generate recommendation data corresponding to recommended actions relative to one or more of the multifunction peripherals in accordance solution data corresponding to identified issues;

the processor further configured to generate, on the display, a dashboard including indicia associated with each predefined category displayed associatively with a badge indicating a corresponding number of recommended actions for that category;

the processor further configured to generate user recommendations on the display in accordance with generated recommendation data, the recommendations including one or more of one or more of device setting changes, modification of installed applications and device servicing corresponding to the recommendation data;

the processor further configures to receive, via the user input, user instructions responsive to displayed user recommendations;

the processor further configured to selectively implement, via the data interface, one or more of the recommended actions in accordance with received user instructions; and the processor further configured to generate an updated dashboard on the display including an updated badge reflective of implemented, recommended actions.

18. The system of claim 17 wherein the memory is further configured to store heuristic data corresponding to multifunction peripheral device usage propensities associated with a business type with which the multifunction peripherals are deployed, and wherein the processor is further configured to generate the recommendation data in accordance with the heuristic data.

19. The system of claim 18 wherein the heuristic data includes data for multifunction peripheral software installations and device software settings associated with the business type.

20. The system of claim 19 wherein the heuristic data is associated with a business type of one of legal, medical, governmental, educational or manufacturing.

* * * * *